Patented Dec. 27, 1938

2,141,637

UNITED STATES PATENT OFFICE 2,141,637

COMPOSITION OF MATTER

Albert L. Ball, Lewiston, N. Y., assignor, by mesne assignments, to The Carborundum Company, Niagara Falls, N. Y., a corporation of Delaware No Drawing. Application November 29, 1935, Serial No. 52,194

7 Claims. (Cl. 106—22)

This invention relates to a heat hardenable resinous cement particularly adapted for joining segments or blocks of bonded material such as bonded abrasive grain.

The new cement is particularly adapted for use in manufacturing segmental pulp wheels, which ordinarily are made by cementing together segments, or annuli such as disks, to form a composite article. The segments or annuli may be made of natural sandstone or may be artificially produced from abrasive grain and bonding material.

In the production of segmental pulp wheels it is necessary to use a cement for joining the segments whose thermal coefficient of expansion is approximately the same as that of the abrasive segments which are to be bonded together. Pulp wheels may be subjected to temperatures far below zero during shipment and are usually operated at temperatures of 65° C. to 95° C. or higher. If steel rings are used to assist in holding the segments of the wheel together they are manufactured so as to have substantially the same coefficient of expansion as the abrasive segments. In order to prevent the various parts of the wheel from pulling apart due to the differing rates of expansion at the joints when there is a change in the temperature of the wheel, it is necessary to provide that all parts of the pulp wheel shall be thermally balanced, that is, all the component parts of the assembled wheel shall possess thermal coefficients of expansion substantially alike, that is, within about $1.5 \times 10^{-6}/°$ C. of each other, so that no harmful stresses are introduced when the temperature of the wheel varies from $-50°$ C. to $+100°$ C.

Various cements have been proposed for this purpose. In practice the cements which have as their essential ingredient one or more heat hardenable substances have been found most suitable although their coefficients of expansion are relatively high. Phenolic condensation product resins have a coefficient of expansion approximately ten times that of the sandstone used for such pulp wheels, which itself has a greater coefficient of expansion than artificial abrasive material.

Fillers having a very low coefficient of expansion are valuable for use with such resinous materials inasmuch as they tend to produce a composite cement having a coefficient of expansion much lower than that of the resinous material alone. For example, pulverized fused quartz is very valuable for use as a filler. This material has a coefficient of expansion of approximately $1 \times 10^{-6}/°$ C.; much lower than that of the abrasive segments to be cemented together. When this material is used as a filler in connection with resinous material having a coefficient of expansion higher than the abrasive segments, the filler because of its extremely low coefficient of expansion tends to reduce the coefficient of expansion of the composite cement to approximate that of the abrasive segments. For a given filler ingredient this requirement as to the coefficient of expansion of the cement substantially fixes the content of filler in the cement. In order to obtain a cement of suitable coefficient of expansion, using a synthetic resin having ten times the desired coefficient of expansion, it is necessary to employ a definite amount of the filler whose coefficient of expansion is less than the desired coefficient of expansion, the amount being ascertained from the relation between the coefficient of expansion of the resin and the coefficient of expansion of the filler.

Aside from a low coefficient of expansion, a filler must be crushed to a fineness which will make a workable mixture with the resinous material, and the particles must be graded as to size. If all the particles of the filler were of the same size they would not pack or nest so as to function suitably as a filler. Uniformly sized particles contact with each other in a way whereby they retain in the structure excessive amounts of the resin. With a gradation of particle size the fine particles pack in between the relatively large particles and the proper wetting of the filler is effected with the desired minimum of resin. In fact if a given synthetic resin has been determined for the manufacture of the cement and there is a variation from time to time in the viscosity of the resin due to aging or differences in manufacturing technique, a slight variation may be made in the relative proportions of coarser and finer particles in the filler so that the workability of the cement may be kept the same.

In preparing a suitable cement it is furthermore necessary that the filler shall contain an appreciable proportion of material having a very small particle size. For example, it is desirable that the material constituting the filler shall contain an appreciable portion, for example 10%, of material consisting of particles whose major dimension is less than ten microns and it is further desirable that approximately half this material shall have a major dimension not greater than five microns.

It is found that making a cement using the proper amount of liquid resinous material and a filler, finely crushed and having the proper gradation of particle size but lacking the particles of extremely small size as defined above, results in a cement having somewhat the characteristics of wet sand. It dries out quickly, is difficult to mold into the proper shape, and will not spread readily under pressure. On the other hand a filler containing the fine particles as defined above produces a cement when used with the proper amount of resinous material which is smooth and buttery in character, having sufficient body to retain any shape in which it is made, yet being sufficiently workable to spread readily under pressure.

In producing a segmental pulp wheel whose cost may be as much as several thousand dollars and whose useful life is to be measured in terms of years, it is essential that the segments making up the wheel shall be lined up perfectly with each other and that a minimum of cement be used between segments to prevent undue wear at the joints. It is apparent therefore that a cement which will spread easily and thinly over the surface of the segments and which will flow sufficiently to penetrate the adjacent pores of the segments and be extruded from the edge of the joint by the pressure exerted in placing the segments in place, but which has at the same time sufficient body to remain in the joint and not leak out has important advantages over a cement which does not possess these requisite qualities. For example, a cement which is granular or sugary or sandy in nature and difficult to spread will not flow under the pressure of the segments when they are placed together, tends to dry out too soon, and tends to lock before the abrasive surfaces can be brought sufficiently close together with the result that voids and the like are formed in the joints. Voids cause the production of an excessive amount of coarse waste fiber during grinding of wood to make pulp, and furthermore, weaken the joint. If additional liquid resinous material is added to such a cement to make it more workable and prevent drying out, this tends to upset the balance desired as to the thermal coefficient of expansion and the excessive amount of liquid tends to run away from the filler with the result that the resinous part of the cement tends to leak out of the joint.

The filler containing the necessary extremely fine portions may be prepared by crushing in any manner which will provide the necessary fines. In connection with the present invention however, it has been found that ball milling the filler to prepare it for use will ordinarily produce a sufficient quantity of material having a major dimension smaller than ten microns, whereas preparing the filler by roll crushing ordinarily will not afford a sufficient amount of the desired fines.

Example I

Fused quartz is ground in a ball mill and the product is screened so as to separate out two fractions, one fraction containing all particles which pass a No. 40 mesh screen but are caught on a No. 200 mesh screen, and the other fraction including all particles which will pass through a No. 200 mesh screen. Sufficient ball milling will ordinarily insure that the fine fraction will contain a considerable proportion of material having a major dimension less than ten microns. If it is found that the ball milled material does not contain a sufficient number of these extreme fines it may be subjected to further ball milling to produce them. Furthermore, it is not essential that the coarse fraction be prepared by a ball milling, or even that the larger sizes of the fine fraction be so prepared. Ball milling appears to be advantageous in that it produces rounded particles, rather than splintery particles as are produced by roll crushing, but it is the presence of the appreciable proportion of material of extremely small size which apparently gives the cement its desirable properties. To give a comparison of the size of this extremely fine material with the larger particles of the finer fraction mentioned above, it may be said that material having a particle size of approximately ten microns would approximate the size of the material which would just pass through a 700 mesh screen, assuming such a screen could be made, and particles having a major dimension of five microns would just pass through an 800 mesh screen, assuming such a screen could be made. Equal portions of the two fractions, that is one containing material just passing a 40 mesh screen and caught on a 200 mesh screen and prepared by ball milling or otherwise, and the other fraction containing particles which will pass through a 200 mesh screen and prepared by ball milling or otherwise but containing a substantial amount of material which has a major dimension less than ten microns, are mixed with a liquid phenolic condensation product resin in the "A" stage. 16.3 parts by weight of the liquid resin are mixed with 10 parts of water and 73.5 parts of filler. The mixture should be wet enough so as to spread readily. As an accelerator .2 part of hexamethylene tetramine may be incorporated. Excellent cements have been made by this method when the finer fraction of the filler contains 20% of material consisting of particles whose major dimension is less than ten microns and about 10% of material consisting of particles whose major dimension is not greater than five microns.

Example II

Fused quartz is ground and screened to separate out two fractions, one including all particles which pass through a 120 mesh screen but are caught on a 200 mesh screen and the other including all particles which pass through a 200 mesh screen and containing an appreciable proportion of material consisting of particles whose major dimension is less than ten microns. One part of the first fraction is mixed with four parts of the second fraction to provide the filler. The filler should contain approximately 10% of material consisting of particles whose major dimension is less than ten microns of which one half should consist of particles whose major dimension is not greater than five microns. 73.5 parts of filler are mixed with 18.3 parts of a liquid phenolic condensation product resin in the "A" stage, to which 8 to 10 parts of water have been added. Either of the methods of these two examples will produce a smooth cement which will spread readily and permit joining the faces which are to be cemented together without premature locking or the formation of voids.

Example III

Fused quartz is ground and screened to separate out three fractions, one including the particles passing a 40 mesh screen and retained on a 100 mesh screen, the next including the particles passing a 100 mesh screen and retained on a 200 mesh screen, and the next including particles passing the 200 mesh screen and including approximately 20% of material consisting of particles whose major dimension is less than ten microns, of which about one half is material consisting of particles whose major dimension is not greater than five microns. By weight 3.9 parts of the first fraction, one part of the second fraction and 4.35 parts of the third fraction are mixed to provide a filler which is mixed with liquid resin to which water has been added, preferably 73.5 parts of filler, 16.3 parts of a liquid phenol condensation product resin in the "A" stage, and 8 to 10 parts of water are used.

To produce cements having larger coefficients of expansion, ball milled particles of gritty materials such as fused alumina or silicon carbide may be substituted as fillers in the above examples provided they contain a sufficient amount of the extremely fine material defined above.

After the sections of abrasive material have been joined together by means of a cement such as is produced in accordance with any of the examples above set forth, the composite wheel is subjected to suitable heat treatment to harden the resinous cement. Some articles are so bulky that a longer time is required to permit the heat to penetrate to all parts of the interior. Moreover, some materials will withstand more heat shock than others. The following is a typical heat treatment for curing the resinous cement used for joining the manufactured abrasive sections of a composite pulp wheel. The cemented sections are clamped together and the article introduced into an oven. The temperature within the oven is gradually raised at a rate of about 25° F. per hour to a temperature of approximately 300° F. The oven is held at a temperature of 300° F. for from twelve to seventy-two (12 to 72) hours depending upon the bulk of the article. The oven is then allowed to cool at the rate of from 5 to 25° F. per hour.

The hardened cement produced in accordance with the first of the examples given is characterized by a coefficient of expansion of 5.5 to $6.0 \times 10^{-6}$ per degree centigrade. This coefficient of expansion corresponds to an artificial abrasive material which has been found to be suitable for the manufacture of composite pulp wheels. It is obvious that in the cement formulae, the ratio of resin to filler will be modified to produce in the hardened cement a different coefficient of expansion when other abrasive materials, such as natural sandstone, constitute the sections which are to be cemented together.

The improved cement which is produced in accordance with my invention works and spreads like mortar. It has technical advantages over a cement having "sugary" characteristics in that a section of the article may be "buttered" with the cement, placed against the adjacent section and then tapped lightly to fit the sections together with the thin joint which is generally requisite. A skilled workman, such as an operator accustomed to cementing blocks of this type of material together will readily understand the advantage of using a cement which spreads readily yet does not flow or leak out of the joint. Moreover the advantage of having the section move readily into closely fitting position by merely tapping the section, the excess cement being extruded from the joint, will be readily understood by such a skilled operator.

My invention is not limited to the use of the particular synthetic resin set forth in the illustrative examples, but may embrace any heat hardenable substance. Neither is my invention limited to the use of fused quartz as a filler. Other frangible materials may be used as fillers provided the particle size necessary for use in the cement is obtained by ball milling. Accordingly, it will be understood that my invention is not limited to the details of the examples given but may be otherwise embodied and practiced within the scope of the following claims.

I claim:

1. A cement comprising a heat hardenable mixture of finely divided inert material and a liquid resinous vehicle therefor, the said finely divided material consisting of particles ranging in size downward from those which will just pass through a No. 40 mesh screen and including an appreciable proportion of material consisting of particles whose major dimension is less than ten microns.

2. A cement comprising a heat hardenable mixture of finely divided inert material and a liquid resinous vehicle therefor, the said finely divided material consisting of equal parts of particles passing a No. 40 mesh screen and retained on a No. 200 mesh screen and particles passing a No. 200 mesh screen and containing an appreciable proportion of material consisting of particles whose major dimension is less than ten microns.

3. A cement comprising a heat hardenable mixture of finely divided inert material and a liquid resinous vehicle therefor, the said finely divided inert material consisting of 1 part of particles passing a No. 120 mesh screen and retained on a No. 200 mesh screen and 4 parts of particles passing a No. 200 mesh screen and including an appreciable proportion of material consisting of particles whose major dimension is less than ten microns.

4. A cement comprising a heat hardenable mixture of finely divided inert material and a liquid resinous vehicle therefor, the said finely divided material consisting of 3.9 parts of particles passing a No. 40 mesh screen and retained on a No. 100 mesh screen, 1 part of particles passing a No. 100 mesh screen and retained on a No. 200 mesh screen, and 4.35 parts of particles passing a No. 200 mesh screen and including a substantial proportion of material consisting of particles whose major dimension is less than ten microns.

5. A cement comprising a heat hardenable mixture of finely divided inert material and a liquid resinous vehicle therefor, the said finely divided material having a substantially lower coefficient of expansion than said resinous vehicle and consisting of an appreciable proportion of particles whose major dimension is less than ten microns and graded larger particles, consisting of those which will just pass a No. 40 mesh screen and such small amounts of particles which are somewhat larger as will not materially change the characteristics of the mass, in such proportions as to provide a mass having sufficient body to retain any shape into which it is formed, yet being sufficiently workable to spread readily under pressure, the said cement having a coefficient of expansion substantially less than that of the resinous vehicle.

6. A cement comprising a heat hardenable mixture of finely divided inert material and a liquid resinous vehicle therefor, the said finely divided material consisting of particles ranging in size downward from those which will just pass through a No. 40 mesh screen and including approximately 10% of material consisting of particles whose major dimension is less than 10 microns and approximately 5% of material consisting of particles whose major dimension is not greater than 5 microns.

7. A cement comprising a heat hardenable mixture of finely divided inert material and a resinous vehicle therefor, the said finely divided material consisting of particles ranging in size downward from those of a size passing a No. 40 mesh screen and retained on a No. 100 mesh screen and including an appreciable proportion of particles whose major dimension is less than 10 microns.

ALBERT L. BALL.